United States Patent [19]
Hung

[11] Patent Number: 5,881,934
[45] Date of Patent: Mar. 16, 1999

[54] CARRYING BOX FOR A PORTABLE COMPUTER

[76] Inventor: Michael Hung, 9-16, Nan Kan Hsia, Nan Kan, Lu Chu Hsiang, Tao Yuan County, Taiwan

[21] Appl. No.: 982,329

[22] Filed: Dec. 2, 1997

[51] Int. Cl.$^6$ ...................................................... B60R 7/04
[52] U.S. Cl. ............................ 224/275; 190/11; 190/109; 190/902; 206/320
[58] Field of Search .............................. 224/275; 108/44; 190/900, 902, 11, 109; 206/320; 297/188.06, 188.07, 188.2

[56] References Cited

U.S. PATENT DOCUMENTS

| | | | |
|---|---|---|---|
| 4,265,286 | 5/1981 | Rapoport | 190/900 |
| 4,483,427 | 11/1984 | Gerch | 190/900 |

FOREIGN PATENT DOCUMENTS

| | | | |
|---|---|---|---|
| 4203503 | 8/1993 | Germany | 190/11 |
| 2124189 | 2/1984 | United Kingdom | 224/275 |

Primary Examiner—Linda J. Sholl
Attorney, Agent, or Firm—Wenderoth, Lind & Ponack, L.L.P.

[57] ABSTRACT

A carrying box which includes a box body adapted for holding a portable computer and computer accessories, a support board hinged to one side panel of the box body and adapted to supporting the box body on a seat, a strap adapted to securing the box body to a back of a seat, an inner cover board hinged to one side of the box body and adapted to close the box body, the inner cover board having an expandable file pouch and pen loops on the inside, and a rigid outer cover board having a flexible linking portion hinged to one side of the box body opposite to the inner cover board and a paper clip on the inside.

7 Claims, 3 Drawing Sheets

CARRYING BOX FOR A PORTABLE COMPUTER

BACKGROUND OF THE INVENTION (a) Field of the Invention

The present invention relates to a carrying box for a portable computer which can be conveniently secured to a front seat inside a car, and serves as a table when opened.

(b) Description of the Prior Art

Regular computer carrying boxes are simply designed for carrying a portable computer. These computer carrying boxes have no means for holding files and writing materials. When a portable computer is carried in a computer carrying box for use in a car, the computer carrying box cannot be firmly secured to a seat inside the car for use as a writing table. Furthermore, these computer carrying boxes cannot sustain an impact.

SUMMARY OF THE INVENTION

The present invention has been accomplished under the circumstances in view. It is the main object of the present invention to provide a computer carrying box which can be firmly secured to a seat in car, and served as a writing table. According to the present invention, the carrying box comprises a box body, the box body comprising a computer chamber adapted to hold a portable computer, an accessory chamber disposed at one side of the computer chamber and adapted to hold computer accessories, a plurality of cushion pads mounted inside the portable computer around the periphery, and two connector links at two ends of a first lateral side panel thereof; a support board having a fixed end hinged to the first lateral side panel of the box body and a free end detachably secured to the corresponding side panel by snap means thereof; a strap adapted to securing the box body to a back of a seat, the strap having two safety hooks at two opposite ends thereof adapted for securing to the connector links on the box body; an inner cover board hinged to one side of the box body and adapted to close the computer chamber and the accessory chamber; zipper means adapted to secure the inner cover board in a close position closed on the computer chamber and the accessory chamber; and a rigid outer cover board for covering over the inner cover board, the rigid outer cover board having a flexible linking portion hinged to one side of the box body opposite to the inner cover board and a paper clip on the inside.

DETAILED DESCRIPTION OF THE PREFERRED EMBODIMENT

Figure 1:
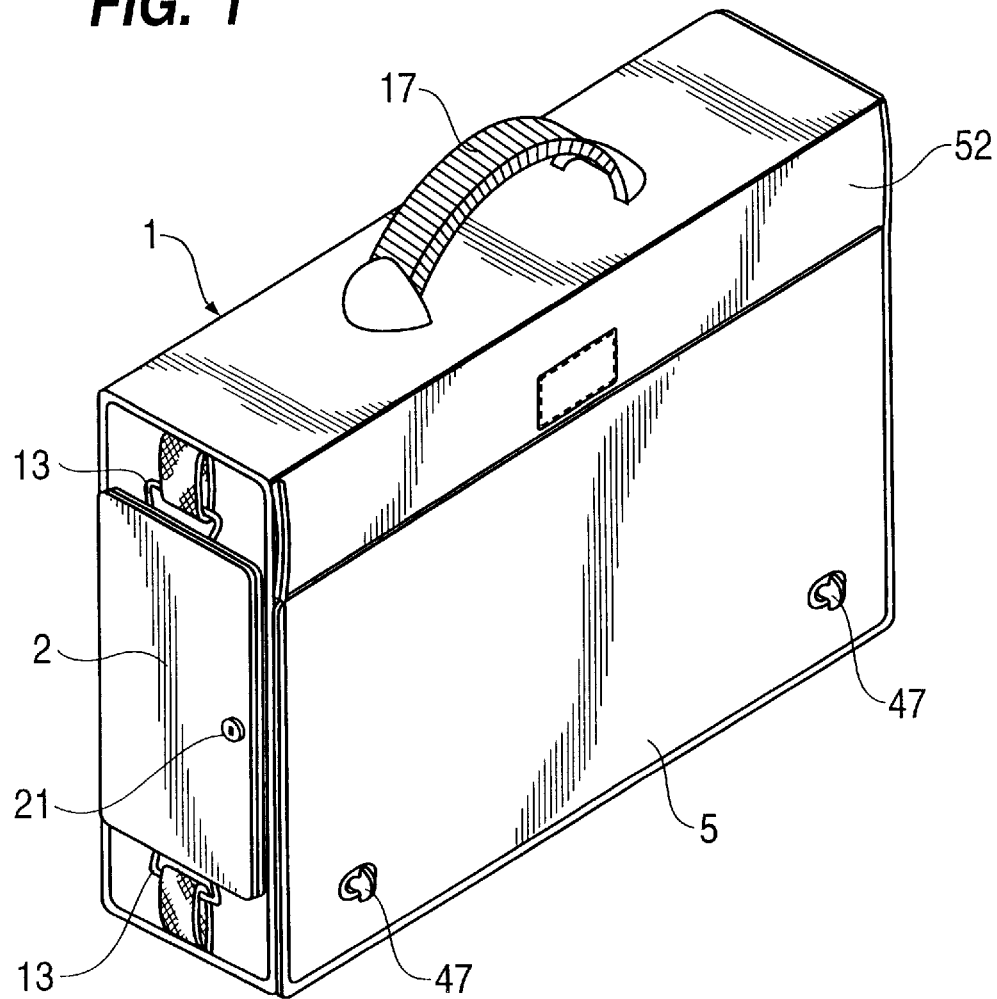
FIG. 1 is an elevational view of a carrying box according to the present invention.
Figure 2:
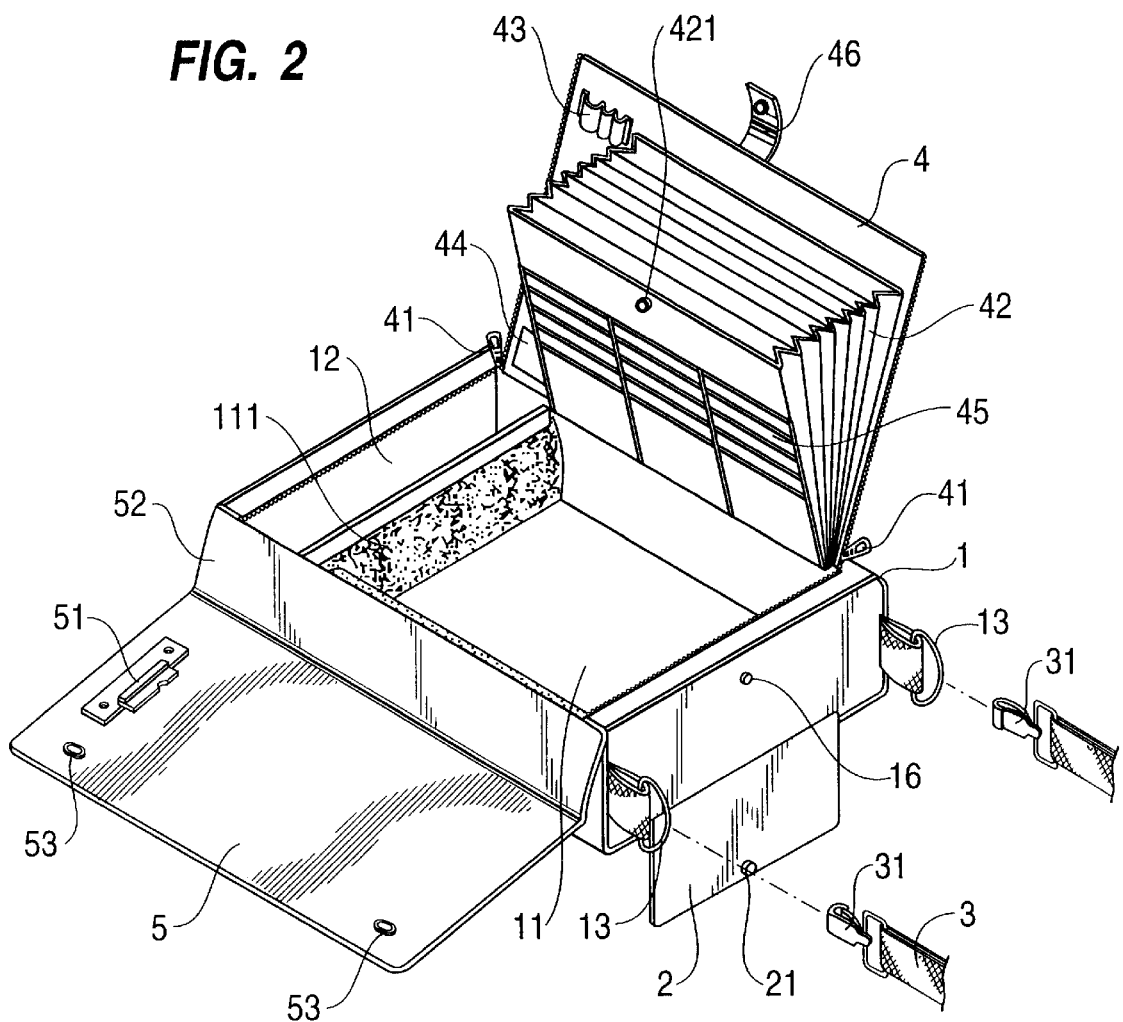
FIG. 2 shows the carrying box opened according to the present invention.

Referring to FIGS. 1 and 2, a carrying box in accordance with the present invention is generally comprised of a box body 1, a support board 2, an elastic strap 3, an inner cover board 4, and an outer cover board 5.

Figure 3:
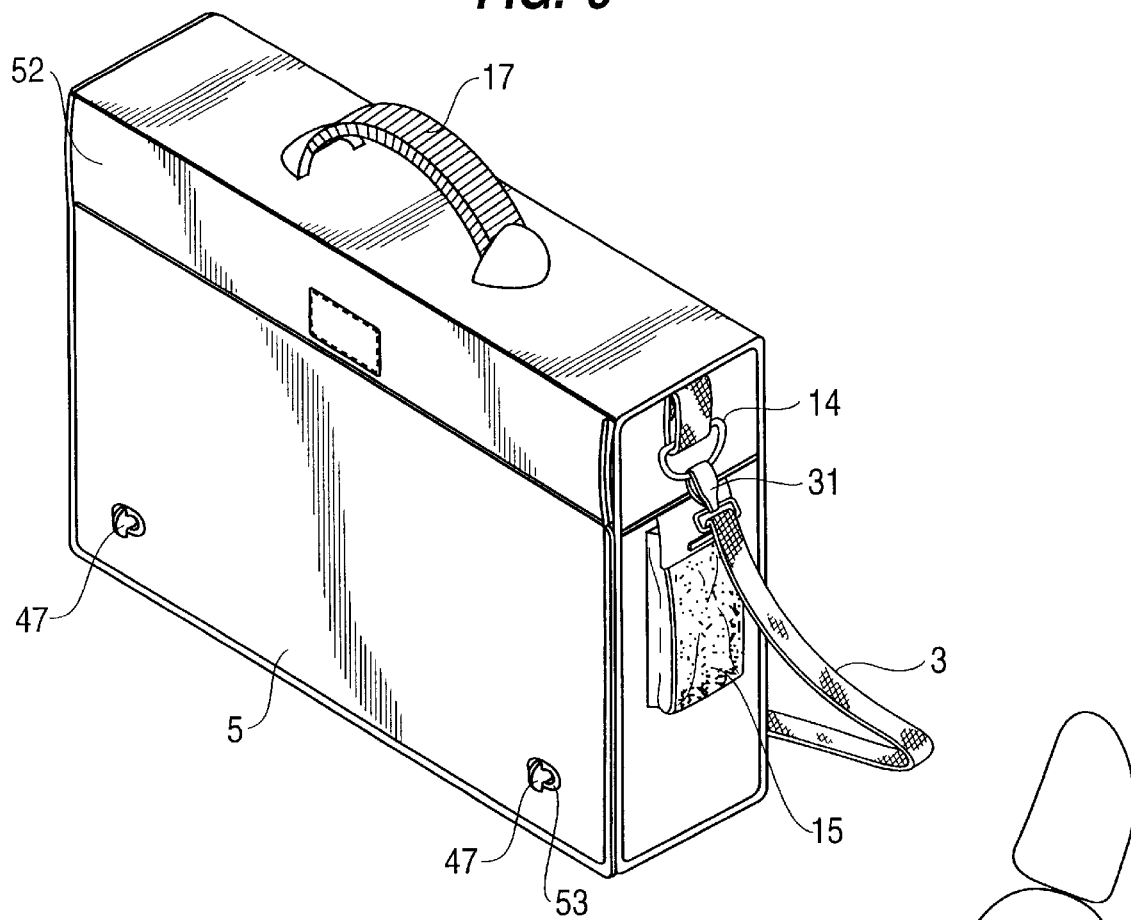
FIG. 3 is another elevational view of the carrying box according to the present invention when viewed from another angle.
Figure 4:
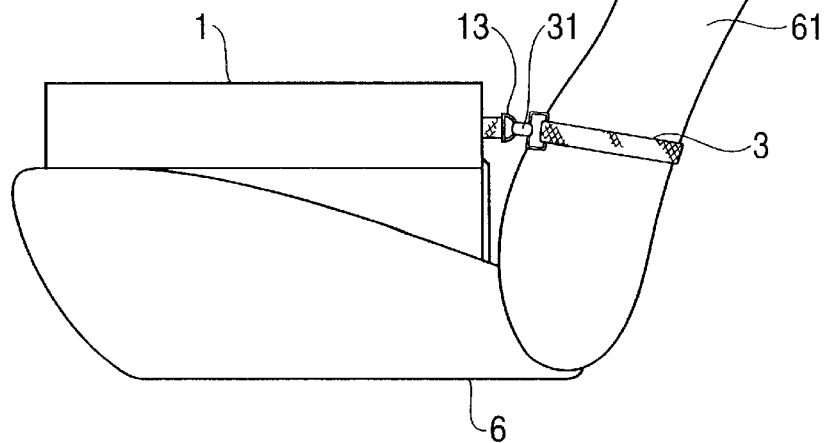
FIG. 4 is an applied view of the present invention, showing the carrying box secured to a seat.

Referring to Figures from 2 to 4 and FIG. 1 again, the box body 1 defines a computer chamber 11, and a accessory chamber 12. Cushion pads 111 are mounted on the inside wall of the computer chamber 11 to protect the storage portable computer against impact. Two first connector links 13 are mounted on two opposite ends of one side panel of the box body 1. A second connector link 14 and a side pocket 15 are disposed at an opposite side panel of the box body 1. The side pocket 15 is adapted to hold for example a cellular telephone. The support board 2 is hinged to one side panel of the box body 1 at the bottom, and can be secured in a closed position closely attached to the outside wall of the corresponding side panel of the box body 1 by a snap 21;16. The snap 21;16 is comprised of a socket side 16 fixedly mounted on the box body 1, and a ball side 21 fixedly mounted on the support board 2. The elastic strap 3 has two safety hooks 31 at its two opposite ends. When the safety hooks 31 are respectively fastened to one first connector link 13 and the second connector link 14, the elastic strap 3 is used as a shoulder strap (see FIG. 3). When the safety hooks 31 are respectively fastened to the first connector link 13, the elastic strap 3 can be used to secure the box body 1 to a back 61 of a seat 6 (see FIG. 4). The inner cover board 4 is hinged to the box body 1 at one side, and adapted to close the computer chamber 11 and the accessory chamber 12. Zippers 41 are provided, and adapted to secure the inner cover board 4 in a close position closed on the computer chamber 11 and the accessory chamber 12. An expandable file pouch 42, a plurality of pen loops 43 and a card pockets 44 are provided at the inner side of the inner cover board 4. A plurality of diskette pockets 45 are provided at an outer side of expandable file pouch 42. A tab 46 is mounted on the outer side of the inner cover board 4, and adapted to close the expandable file pouch 42 by a snap 421. Two turn-locks 47 are provided at the outer side of the inner cover board 4, and adapted to secure the outer cover board 5 in a close position. The outer cover board 5 is a rigid board having a flexible linking portion 52 hinged to one side of the box body 1 opposite to the inner cover board 4. A paper clip 51 is provided at the inner side of the outer cover board 5. Two lock holes 53 are provided at the outer cover board 5. After the inner cover board 4 has been closed on the computer chamber 11 and the accessory chamber 12, the outer cover board 5 is covered over the inner cover board 4, permitting the turn-locks 47 of the inner cover board 4 to be fastened to the lock holes 53 to secure the outer cover board 5 in position (see FIGS. 1 and 3). Further, a carrying handle 17 is provided at one side panel of the box body 1.

Referring to FIGS. 2 and 4 again, when the ball side 21 on the support board 2 is disconnected from the socket side 16 on the box body 1, the support board 2 is turned outwards from the box body 1 to support the box body 1 in a horizontal position on a seat 6. Further, when the outer cover board 5 is opened, it serves as a table top for writing.

While only one embodiment of the present invention has been shown and described, it will be understood that various modifications and changes could be made thereunto without departing from the spirit and scope of the invention disclosed.

What the invention claimed is:

1. A carrying box comprising:

a box body, said box body comprising a computer chamber adapted to hold a portable computer, an accessory chamber disposed at one side of said computer chamber and adapted to hold computer accessories, a plurality of cushion pads mounted inside said portable computer around the periphery, and two connector links at two ends of a first lateral side panel thereof;

a support board having a fixed end hinged to the first lateral side panel of said box body and a free end detachably secured to the corresponding side panel by snap means thereof;

a strap adapted to securing said box body to a back of a seat, said strap having two safety hooks at two opposite ends thereof adapted for securing to the connector links on said box body;

an inner cover board hinged to one side of said box body and adapted to close said computer chamber and said accessory chamber;

zipper means adapted to secure said inner cover board in a close position closed on said computer chamber and said accessory chamber; and a rigid outer cover board for covering over said inner cover board, said rigid outer cover board having a flexible linking portion hinged to one side of said box body opposite to said inner cover board.

2. The carrying box of claim 1, wherein said box body comprises a third connector link mounted on a second lateral side panel of said box body opposite to said first lateral side panel.

3. The carrying box of claim 1, wherein said box body comprises a side pocket disposed on the outside and adapted to hold a cellular telephone.

4. The carrying box of claim 1, wherein said inner cover board comprises an expandable file pouch, a plurality of pen loops and a plurality of card pockets respectively disposed at an inner side, and snap means adapted to fasten said expandable file pouch in a closed condition, said expandable file pouch having a plurality of diskette pockets at an outer side.

5. The carrying box of claim 1, wherein said outer cover board comprises a paper clip at an inner side.

6. The carrying box of claim 1, wherein said outer cover board comprises two lock holes; said inner cover board comprises two turn-locks adapted for fastening to said lock holes on said outer cover board to secure said outer cover board in a closed position covered on said inner cover board.

7. The carrying box of claim 1, wherein said strap is made from elastic material.

* * * * *